(12) United States Patent
Edanami

(10) Patent No.: US 6,661,744 B2
(45) Date of Patent: Dec. 9, 2003

(54) MSR MAGNETO-OPTICAL RECORDING MEDIUM, RECORDING AND REPRODUCING METHOD THEREFOR, AND STORAGE UNIT USING MSR MAGNETO-OPTICAL RECORDING MEDIUM

(75) Inventor: Hiroyuki Edanami, Higashine (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 09/898,186

(22) Filed: Jul. 3, 2001

(65) Prior Publication Data
US 2002/0105820 A1 Aug. 8, 2002

(30) Foreign Application Priority Data
Feb. 5, 2001 (JP) ........................................ 2001-028714

(51) Int. Cl.[7] .............................................. G11B 11/00
(52) U.S. Cl. .................................................. 369/13.27
(58) Field of Search ........................... 369/13.27, 13.26, 369/13.25, 13.24, 13.14, 47.53, 116, 53.31, 53.44

(56) References Cited

U.S. PATENT DOCUMENTS 5,982,714 A * 11/1999 Koda ...................... 369/13.26
6,125,085 A * 9/2000 Fuji et al. ................ 369/13.27
6,249,490 B1 * 6/2001 Miyaoka .................. 369/13.27
6,356,515 B1 * 3/2002 Kumita et al. ........... 369/13.27

FOREIGN PATENT DOCUMENTS

| JP | 04-258831 | 9/1992 |
| JP | 07-029238 | 1/1995 |
| JP | 07-262643 | 10/1995 |
| JP | 20-00182292 | 6/2000 |

* cited by examiner

Primary Examiner—Tan Dinh
(74) Attorney, Agent, or Firm—Greer, Burns & Crain, Ltd.

(57) ABSTRACT

A storage unit having functions of controlling a write power, a read power and a reproducing magnetic field with respect to an optical recording medium, is provided with a first section for storing test write data on the optical recording medium for each write temperature information during a write, and a second section for controlling at least the reproducing magnetic field depending on optimum reproducing conditions which are obtained by reproducing the test write data corresponding to a write temperature of data which is to be actually reproduced from the optical recording medium during a read.

12 Claims, 13 Drawing Sheets

FIG.8

| | | | | | | |
|---|---|---|---|---|---|---|
| FFFFFFFF IDENTIFICATION SYMBOL | 0A1E TEMPERATURE 10~30 | 00099A00 START ADDRESS OF READ TEST TRACK 99A/00 | 00099C08 END ADDRESS OF READ TEST TRACK 99C/08 | 00000300 START ADDRESS 1 OF CORRESPONDING DATA 3/00 | 00000310 END ADDRESS 1 OF CORRESPONDING DATA 3/10 | |
| FFFFFFFF IDENTIFICATION SYMBOL | 1F32 TEMPERATURE 31~50 | 00099C09 START ADDRESS OF READ TEST TRACK 99C/09 | 00099E0F END ADDRESS OF READ TEST TRACK 99E/0F | 00000400 START ADDRESS 1 OF CORRESPONDING DATA 4/00 | 00000410 END ADDRESS 1 OF CORRESPONDING DATA 4/10 | |
| FFFFFFFF IDENTIFICATION SYMBOL | 333C TEMPERATURE 51~60 | 00099E10 START ADDRESS OF READ TEST TRACK 99E/10 | 0009A207 END ADDRESS OF READ TEST TRACK 9A2/07 | 00000506 START ADDRESS 1 OF CORRESPONDING DATA 5/06 | 00000508 END ADDRESS 1 OF CORRESPONDING DATA 5/08 | 00000500 START ADDRESS 2 OF CORRESPONDING DATA 5/00    00000505 END ADDRESS 2 OF CORRESPONDING DATA 5/05 |
| FFFFFFFF IDENTIFICATION SYMBOL | 3D31 TEMPERATURE 61~65 | 0009A208 START ADDRESS OF READ TEST TRACK 9A2/08 | 0009A40E END ADDRESS OF READ TEST TRACK 9A2/07 | 00000509 START ADDRESS 1 OF CORRESPONDING DATA 5/09 | 00000510 END ADDRESS 1 OF CORRESPONDING DATA 5/10 | 00000600 START ADDRESS 2 OF CORRESPONDING DATA 6/00    00000602 END ADDRESS 2 OF CORRESPONDING DATA 6/02 |
| | | | | | FFFFFFFF END IDENTIFICATION SYMBOL | |

FIG.9

| IDENTIFICATION SYMBOL | | START ADDRESS OF READ TEST TRACK | END ADDRESS OF READ TEST TRACK |
|---|---|---|---|
| FFFFFFFF IDENTIFICATION SYMBOL | 0A1E TEMPERATURE 10~30 | 00099A00 START ADDRESS OF READ TEST TRACK 99A/00 | 00099C08 END ADDRESS OF READ TEST TRACK 99C/08 |
| FFFFFFFF IDENTIFICATION SYMBOL | 1F32 TEMPERATURE 31~50 | 00099C09 START ADDRESS OF READ TEST TRACK 99C/09 | 00099E0F END ADDRESS OF READ TEST TRACK 99E/0F |
| FFFFFFFF IDENTIFICATION SYMBOL | 333C TEMPERATURE 51~60 | 00099E10 START ADDRESS OF READ TEST TRACK 99E/10 | 0009A207 END ADDRESS OF READ TEST TRACK 9A2/07 |
| FFFFFFFF IDENTIFICATION SYMBOL | 3D31 TEMPERATURE 61~65 | 0009A208 START ADDRESS OF READ TEST TRACK 9A2/08 | 0009A40E END ADDRESS OF READ TEST TRACK 9A2/07 |

FFFFFFFF END IDENTIFICATION SYMBOL

MSR MAGNETO-OPTICAL RECORDING MEDIUM, RECORDING AND REPRODUCING METHOD THEREFOR, AND STORAGE UNIT USING MSR MAGNETO-OPTICAL RECORDING MEDIUM

BACKGROUND OF THE INVENTION

This application claims the benefit of a Japanese Patent Application No. 2001-028714 filed Feb. 5, 2001, in the Japanese Patent Office, the disclosure of which is hereby incorporated by reference.

1. Field of the Invention

The present invention generally relates to optical recording media, recording and reproducing methods and storage units, and more particularly to an optical recording medium such as a magneto-optical recording medium which uses magnetic super resolution (MSR), and to a recording and reproducing method and a storage unit which are suited for reproducing information from such an optical recording medium.

Recently, the recording densities of optical recording media have increased, and of the magneto-optical recording media such as the magneto-optical disk, there are recording media which were developed to use the MSR. In this specification, a recording medium which uses the MSR will be referred to as a MSR recording medium. When reproducing information from the MSR recording medium, it is desirable to obtain a stable reproduced output regardless of changes in temperature and laser power.

2. Description of the Related Art

For example, a Japanese Laid-Open Patent Application No. 7-29238 proposes a method which records a reference signal on a disk in advance, stores values such as a reproduced signal amplitude and a carrier-to-noise (C/N) ratio, and compares the reference signal which is reproduced from the disk and a reference value when the disk is loaded into a storage unit (disk unit) or the storage unit is started. According to this proposed method, a reproducing laser power is appropriately controlled to carry out a temperature compensation for cancelling a change in the magnetic characteristic caused by a temperature change at the time of the reproduction, based on a comparison result. In other words, the changes in the environmental temperature and the laser power are detected, and the laser power, the pulse width or the like are controlled based on the detected results.

Such a method is also proposed in Japanese Laid-Open Patent Applications No. 4-258831 and No. 7-262643.

However, the proposed method described above does not take into consideration the peculiar problems which are generated at the time of reproduction of the MSR recording medium. In other words, in the case of the MSR recording medium, even if the temperature at the time of the reproduction is the same, the optimum conditions such as the laser power and the reproducing magnetic field at the time of the reproduction differ if the temperatures at the time of the recording differ. Hence, unless the temperature at the time of the recording is known in advance, it is extremely difficult to obtain the optimum conditions for the reproduction. In addition, since the information recording with respect to the MSR recording medium is carried out at arbitrary timings, the temperatures at the time of the recording in many cases differ depending on the recording regions on the MSR recording medium, thereby making it further difficult to obtain the optimum conditions for the reproduction for each of the recording regions.

FIG. 1 is a diagram showing a relationship between a reproducing magnetic field and an error rate of a MSR recording medium for four different recording and reproducing conditions. FIG. 1 shows the reproducing magnetic field with respect to one track on the MSR recording medium for a case where the MSR recording medium is a disk. In FIG. 1, a solid line indicates the relationship for a room-temperature recording (hereinafter referred to as a write) and a room-temperature reproduction (hereinafter referred to as a read), a dotted line indicates the relationship for a room-temperature write and a high-temperature read, a one-dot chain line indicates the relationship for a high-temperature write and a high-temperature read, and a double line indicates the relationship for a high-temperature write and a room-temperature read. In this case, the room temperature is 25° C., and the high temperature is 55° C. Furthermore, H1 denotes a point of inflection (hereinafter referred to as an inflection point) for the room-temperature write and room-temperature read, H2 denotes a inflection point for the high-temperature write and high-temperature read, H3 denotes a inflection point for the room-temperature write and high-temperature read, and H4 denotes a inflection point for the high-temperature write and room-temperature read.

As may be seen from FIG. 1, in the case of the MSR recording medium, the optimum read conditions change when the write temperature changes, even if the read temperature is the same, and a relationship H1<H2<H3 stands. In addition, the values of the inflection points H1, H2, H3 and H4 change depending on the radial position on the MSR recording medium, production lot and the like of the MSR recording medium.

In the conventional magneto-optical disk unit, a test write and read is carried out with respect to a test track region on the magneto-optical disk, so as to determine a write laser power (hereinafter simply referred to as a write power), a read laser power (hereinafter simply referred to as a read power), and a reproducing magnetic field which are optimum. When determining such optimum values, a value which is obtained by adding a constant value α to the inflection point is regarded as the optimum reproducing magnetic field, by taking into consideration the inconsistencies in the read power and the reproducing magnetic field. This constant value α is obtained by actual measurement or calculation, by taking into account the effects such as the inconsistencies within one track on the magneto-optical disk and the crosstalk from the adjacent tracks.

However, when the reproducing conditions are determined by carrying out the test write and read with respect to the test track region, in the case of the room-temperature write and high-temperature read, it is only possible to obtain the inflection point H1 of the reproducing magnetic field for the room-temperature write and room-temperature read in FIG. 1 by the test read during the write, and the inflection point H2 of the reproducing magnetic field for the high-temperature write and high-temperature read in FIG. 1 by the test read during the read. The inflection point H3 of the reproducing magnetic field for the room-temperature write and high-temperature read shown in FIG. 1 and the inflection point H4 of the high-temperature write and room-temperature read shown in FIG. 1, which are actually required, cannot be obtained.

Similarly, when the reproducing conditions are determined by carrying out the test write and read of the reference signal in advance at the room temperature as in the proposed method described above, it is only possible to obtain the inflection point H1 of the reproducing magnetic field for the room-temperature write and room-temperature read shown in FIG. 1 by the room-temperature test read, and the inflection point H3 of the reproducing magnetic field for the room-temperature write and high-temperature read shown in FIG. 1 by the high-temperature test read. The inflection point H2 of the reproducing magnetic field for the high-temperature write and high-temperature read shown in FIG. 1, and the inflection point H4 of the reproducing magnetic field for the high-temperature write and room-temperature read shown in FIG. 1, which are actually required, cannot be obtained.

Accordingly, when the optimum values for the read power and the reproducing magnetic field with respect to the temperature at the time of the test read are obtained by the test read but the error rate is poor if the actual data read is carried out using these optimum values, it is possible to update the optimum values by carrying out a retry by changing the read power and the reproducing magnetic field. A method of updating the optimum values while carrying out the retry in such a manner is proposed in a Japanese Laid-Open Patent Application No. 2000-182292, for example.

However, if data having different write temperatures coexist on the magneto-optical disk, the retry is carried out frequently according to this method of updating the optimum values while carrying out the retry, and the retry time consequently becomes long. Normally, the data having the different write temperatures coexist on the magneto-optical disk in most cases, and the increase of the retry time cannot be avoided. On the other hand, the retry time is limited depending on a host unit which uses the magneto-optical disk unit, and the retry may be ended by a time-out if the retry is frequently generated.

In addition, when the method of updating the optimum values while carrying out the retry is applied to the MSR recording medium, the data itself may be erased if the read power at the time of the actual data read is set too large.

A description was given above with respect to the write conditions and the read conditions at the room temperature and the high temperature. The reproducing magnetic field with respect to the write temperature and the read temperature, including the low temperature, is as shown in FIG. 2. FIG. 2 is a diagram showing inflection points of the reproducing magnetic field which are plotted for a MSR recording medium different from that of FIG. 1. In FIG. 2, the ordinate indicates the magnetic field, and the abscissa indicates the read temperature. Moreover, symbols "●", "■", "▲", "♦", "*", "*" and "|" respectively indicate cases where the write temperature is 10° C., 20° C., 30° C., 40° C., 50° C., 60° C. and 65° C. As may be seen from FIG. 2, a relationship H1 <H2<H3 stands among an inflection point H1 for the room-temperature write and room-temperature read, an inflection point H2 for the high-temperature write and high-temperature read, and an inflection point H3 for the room-temperature write and high-temperature read.

In the case of the MSR recording medium, even if the reproducing temperature is the same, the optimum conditions such as the laser power and the reproducing magnetic field at the time of the reproduction are different if the temperatures at the time of the recording are different. As a result, there was a problem in that it is extremely difficult to obtain the optimum conditions for the reproduction unless the temperature at the time of the recording is known in advance. In addition, because the information recording is carried out with respect to the MSR recording medium at arbitrary timings, the temperature at the time of the recording differs depending on the recording region on the MSR recording medium in most cases, and there was another problem in that it is even more difficult to obtain the optimum conditions for the reproduction for each recording region on the MSR recording medium.

SUMMARY OF THE INVENTION

Accordingly, it is a general object of the present invention to provide a novel and useful optical recording medium, recording and reproducing method and storage unit, in which the problems described above are eliminated.

Another and more specific object of the present invention is to provide an optical recording medium, recording and reproducing method and a storage unit which enable satisfactory information reproduction by obtaining optimum conditions such as laser power and reproducing magnetic field for the reproduction, regardless of the temperatures during the recording and reproduction.

Still another object of the present invention is to provide an optical recording medium comprising a test track region corresponding to each zone, and a corresponding map portion of read test track region, wherein the test track region including a test track region portion which includes one or more test tracks to which a test write and a test read are carried out, and a temperature-based read test track region portion, the temperature-based read test track region portion includes one or more read test tracks, and a recording is made at an optimum write power for a write temperature during a write and a test read is made during a read so that at least an optimum reproducing magnetic field is set, and the corresponding map portion of the read test track region is recorded with an identification symbol which indicates a boundary of a map, a start address and an end address of the read test track for each write temperature information, a start address and an end address of each corresponding data, and an end identification symbol which indicates an end position of the map. According to the optical recording medium of the present invention, it is possible to realize a satisfactory information reproduction by obtaining optimum conditions such as the laser power and the reproducing magnetic field for the reproduction, regardless of the temperatures during the recording and reproduction.

A further object of the present invention is to provide a storage unit having functions of controlling a write power, a read power and a reproducing magnetic field with respect to an optical recording medium, comprising first means for storing test write data on the optical recording medium for each write temperature information during a write, and second means for controlling at least the reproducing magnetic field depending on optimum reproducing conditions which are obtained by reproducing the test write data corresponding to a write temperature of data which is to be actually reproduced from the optical recording medium during a read. According to the storage unit of the present invention, it is possible to realize a satisfactory information reproduction by obtaining optimum conditions such as the laser power and the reproducing magnetic field for the reproduction, regardless of the temperatures during the recording and reproduction.

Another object of the present invention is to provide a recording and reproducing method adapted to a storage unit which has functions of controlling a write power, a read power and a reproducing magnetic field with respect to an optical recording medium, comprising the steps of storing test write data on the optical recording medium for each write temperature information during a write, and controlling at least the reproducing magnetic field depending on optimum reproducing conditions which are obtained by reproducing the test write data corresponding to a write temperature of data which is to be actually reproduced from the optical recording medium during a read. According to the recording and reproducing method of the present invention, it is possible to realize a satisfactory information reproduction by obtaining optimum conditions such as the laser power and the reproducing magnetic field for the reproduction, regardless of the temperatures during the recording and reproduction.

Still another object of the present invention is to provide an optical recording medium comprising a test track region corresponding to each zone, where the test track region includes a corresponding map portion of a read test track region, a test track region portion, and a temperature-based read test track region portion, the test track region portion includes one or more test tracks to which a test write and a test read are carried out, the temperature-based read test track region portion includes one or more read test tracks, and a recording is made at an optimum write power for a write temperature during a write and a test read is made during a read, so that at least an optimum reproducing magnetic field is set, and the corresponding map portion of the read test track region includes an identification symbol which indicates a boundary of a map, a start address and an end address of a read test track for each write temperature information, a start address and an end address of each corresponding data, and an end identification symbol which indicates an end position of the map. According to the optical recording medium of the present invention, it is possible to realize a satisfactory information reproduction by obtaining optimum conditions such as the laser power and the reproducing magnetic field for the reproduction, regardless of the temperatures during the recording and reproduction.

Other objects and further features of the present invention will be apparent from the following detailed description when read in conjunction with the accompanying drawings.

BRIEF DESCRIPTION OF THE DRAWINGS

FIG. 8 is a diagram for explaining the corresponding map portion of the read test track region in a modification;

FIG. 9 is a diagram for explaining a setting table of the modification;

DESCRIPTION OF THE PREFERRED EMBODIMENTS

Figure 3:
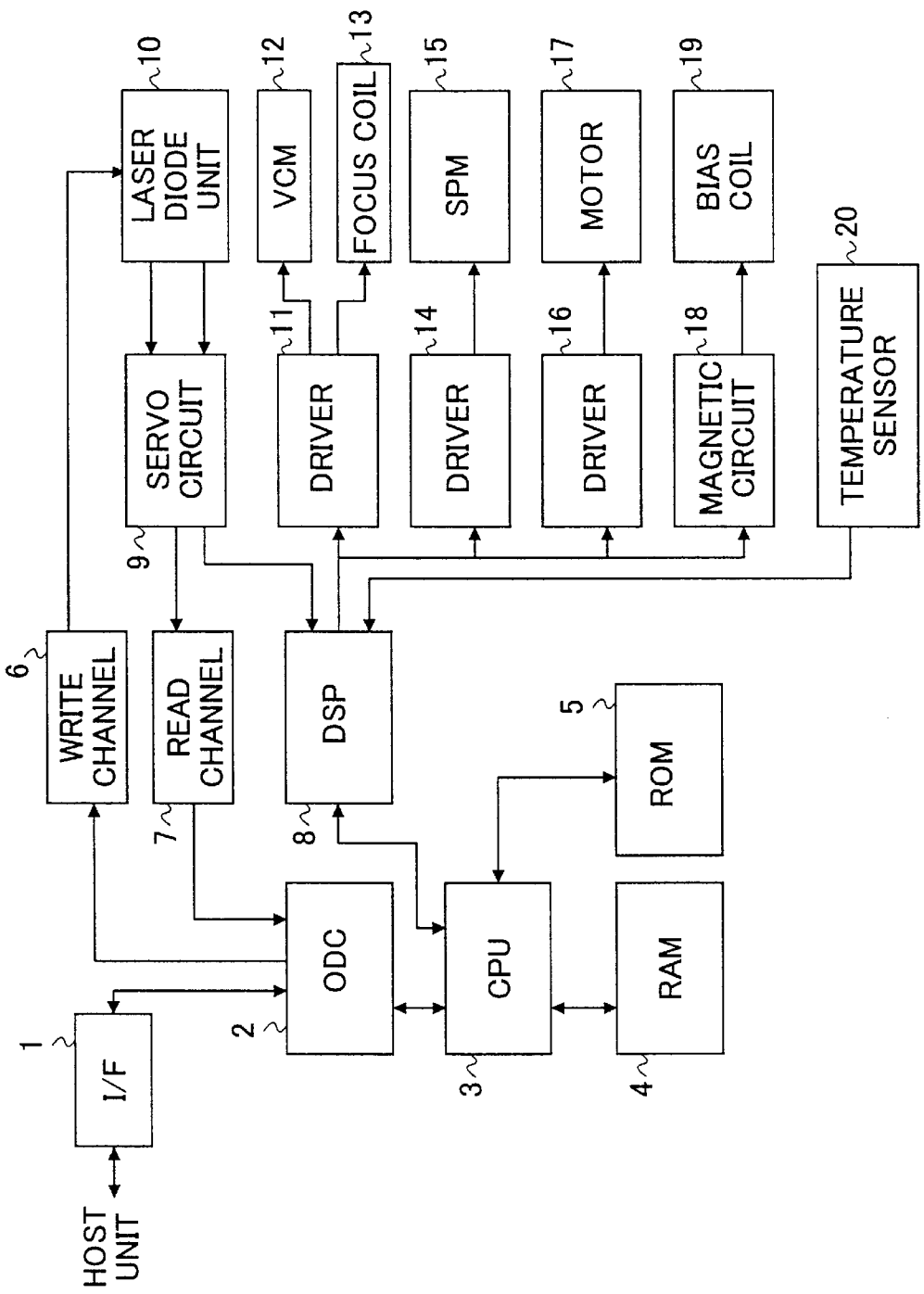
FIG. 3 is a system block diagram showing an embodiment of a storage unit according to the present invention.

FIG. 3 is a system block diagram showing an embodiment of a storage unit according to the present invention. This embodiment of the storage unit employs an embodiment of an optical recording medium according to the present invention and an embodiment of a recording and reproducing method according to the present invention. In this embodiment, the present invention is applied to a magneto-optical disk unit.

In FIG. 3, the magneto-optical disk unit generally includes an interface (I/F) 1, an optical disk controller (ODC) 2, a CPU 3, a RAM 4, a ROM 5, a write channel 6, a read channel 7, a digital signal processor (DSP) 8, a servo circuit 9, a laser diode unit 10, drivers 11, 14 and 16, a voice coil motor (VCM) 12, a focus coil 13, a spindle motor (SPM) 15, a load/eject motor 17, a magnetic circuit 18, a bias coil 19, and a temperature sensor 20.

The interface 1 is coupled to a host unit (not shown). The CPU 3 uses the RAM 4 as a work area and the like, and controls the entire operation of the magneto-optical disk unit, including the ODC 2 and the DSP 8, according to a program stored in the ROM 5.

During a write access, the ODC 2 generates a recording format by dividing NRZ write data into sector units of a MSR disk (not shown), generates and adds an error correction code (ECC) in units of sector write data, and generates and adds a cyclic redundancy check (CRC) code if necessary. In this embodiment, the MSR disk employs a double-mask-rear-aperture-detection (DRAD) system. In addition, the ODC 2 converts the sector data having the encoded ECC into a 1–7 run length limited (RLL) code, for example.

On the other hand, during a read access, the ODC 2 carries out a 1–7 RLL reverse conversion with respect to the sector data, and carries out an error detection and error correction using the ECC after carrying out the CRC. Furthermore, the ODC 2 connects the NRZ data in sector units to form a NRZ read data stream which is transferred to the host unit.

The write channel 6 controls the power of a laser diode within the laser diode unit 10, and converts the write data into a PPM recording or PWM recording data format. The laser diode unit 10 records the write data on and reproduces the data from the MSR disk by a known method. The data reproduced from the MSR disk by the laser diode unit 10 is subjected to processes such as differential amplification and automatic gain control (AGC) in the servo circuit 9, and of the reproduced data, an identification (ID) signal and a magneto-optical (MO) signal are supplied to the read channel 7, while a tracking error signal (TES) and a focus error signal (FES) are supplied to the DSP 8.

The read data which is demodulated in the read channel 7 is supplied to the ODC 2 and restored to the NRZ sector data as described above, and is converted into the NRZ read data stream before being transferred to the host unit via the interface 1. The data which is transferred to the host unit may be transferred via the RAM 4 and the interface 1.

The CPU 3 controls the VCM 12 which drives a carriage (not shown) which is mounted with an objective lens, and the focus coil 13, via the DSP 8 and the driver 11, based on the TES and the FES, so as to control a spot position of a laser beam on the MSR disk. In addition, the CPU 3 controls the SPM 15 which rotates the MSR disk, via the DSP 8 and the driver 14. In this embodiment, the recording format of the MSR disk is in conformance with the zone constant angular velocity (ZCAV) system, and thus, the SPM 15 is rotated at a constant velocity. Furthermore, the CPU 3 controls the load/eject motor 17 via the DSP 8 and the driver 16. The load/eject motor 17 loads the MSR disk into and ejects the MSR disk from the magneto-optical disk unit by a known method. The CPU 3 controls the bias coil 19 via the DSP 8 and the magnetic circuit 18, so as to control the magnetic field with respect to the MSR disk, more particularly, the external magnetic field at the time of the erasure, recording and reproduction with respect to the MSR disk.

The temperature sensor 20 is desirably provided in a vicinity of a loaded position of the MSR disk, and supplies a temperature detection signal to the CPU 3 via the DSP 8. The CPU 3 controls the power of the laser diode within the laser diode unit 10 during the erasure, recording and reproduction, via the ODC 2 and the write channel 6, based on the temperature detected by the temperature sensor 20. In addition, the CPU 3 controls the magnetic field with respect to the MSR disk during the erasure, recording and reproduction, by controlling the bias coil 19 via the DSP 8 and the magnetic circuit 28.

In this embodiment, test write data is stored for each write temperature during the write, and during the read, the test write data is reproduced which corresponds to the write temperature of the data which is to be actually reproduced, so as to obtain optimum reproducing conditions.

Figure 4:
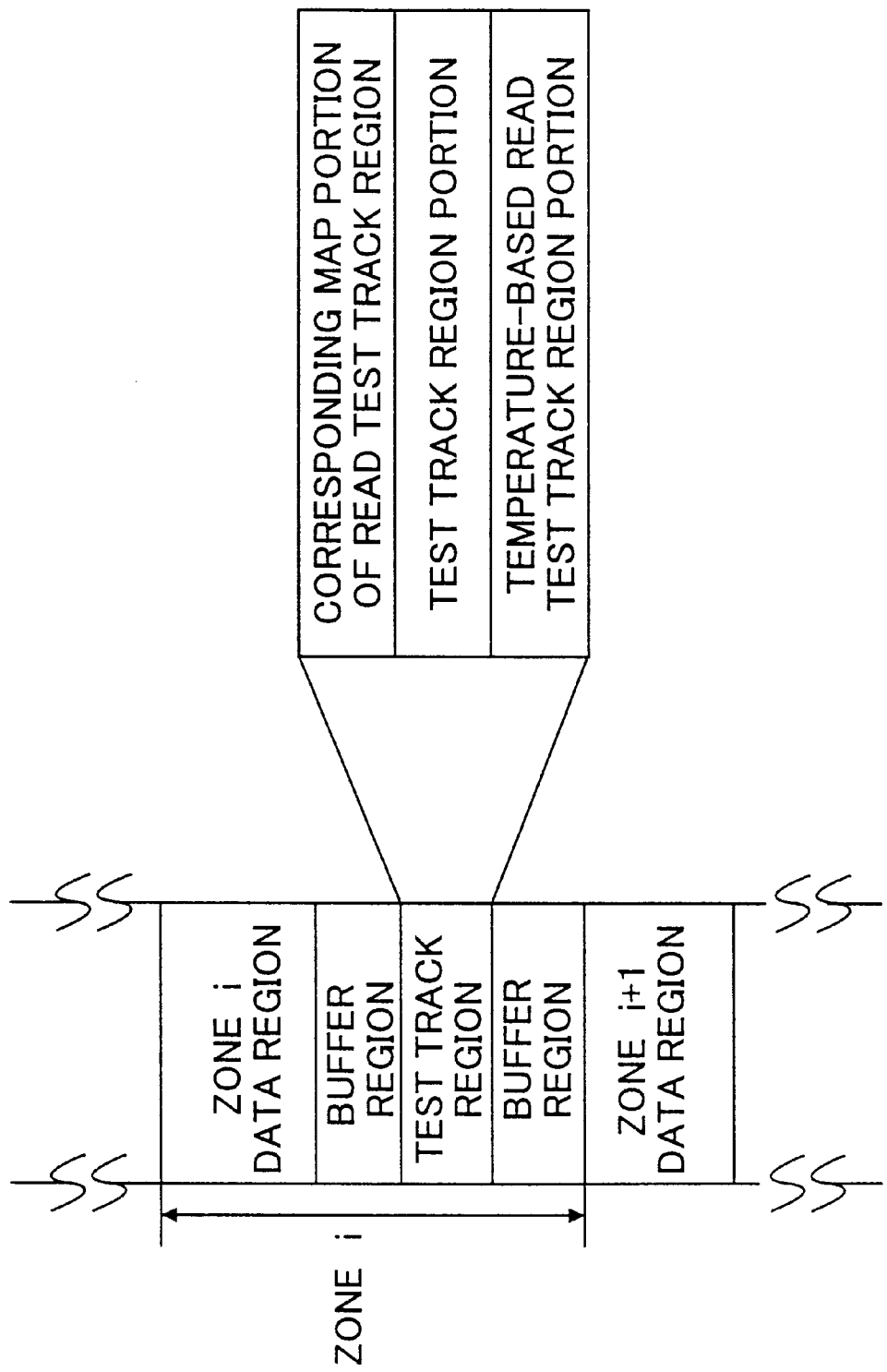
FIG. 4 is a diagram showing a zone format of an embodiment of an optical recording medium according to the present invention.

FIG. 4 is a diagram showing a zone format of an embodiment of the optical recording medium according to the present invention. In this embodiment, the MSR disk is divided into a plurality of zones, similarly to the conventional optical disk. Each zone includes a zone data region, a buffer region, a test track region and a buffer region, as shown in FIG. 4 for an arbitrary zone i. In this embodiment, a structure of the test track region within each zone is different from that of the conventional optical disk. As shown in FIG. 4, the test track region includes a corresponding map portion of the read test track region, a test track region portion, and a temperature-based read test track region portion.

The zones include the zones for the CAV or constant linear velocity (CLV) control in the recording format of the CAV (or ZCAV) or CLV recording format, three zones respectively at the inner peripheral part, central part and outer peripheral part of the disk.

Figure 5:
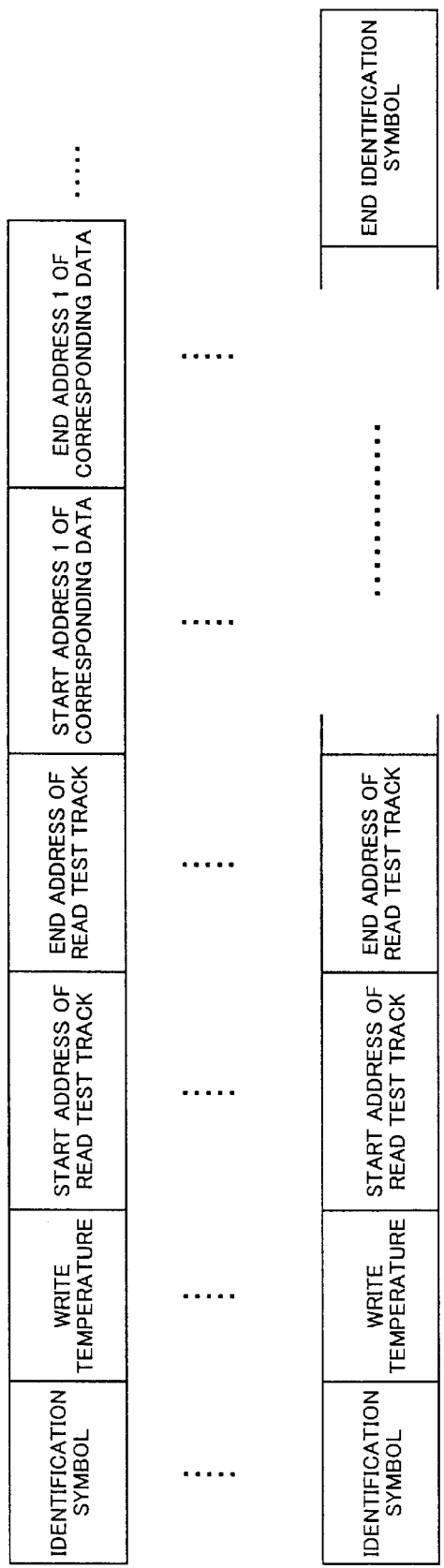
FIG. 5 is a diagram for explaining a corresponding map portion of a read test track region.

The test track region portion includes one or more test tracks to which the test write and the test read are carried out similarly as in the case of the conventional test track region. The temperature-based read test track region portion includes one or more read test tracks, to which the recording is made at an optimum write power for he write temperature during the write, and from which the test read is made to set the optimum read power and reproducing magnetic field during the read. The corresponding map portion of the read test track region includes an identification symbol which indicates a boundary of a map, a start address and an end address of the read test track for each write temperature, a start address and an end address of each corresponding data, and an end identification symbol which indicates an end position of the map, as shown in FIG. 5. FIG. 5 is a diagram for explaining the corresponding map portion of the read test track region of this embodiment. Accordingly, by reproducing this corresponding map portion of the read test track region, it is possible to know the write temperature of the data which is presently to be reproduced, and the address of the corresponding read test track.

Figure 6:
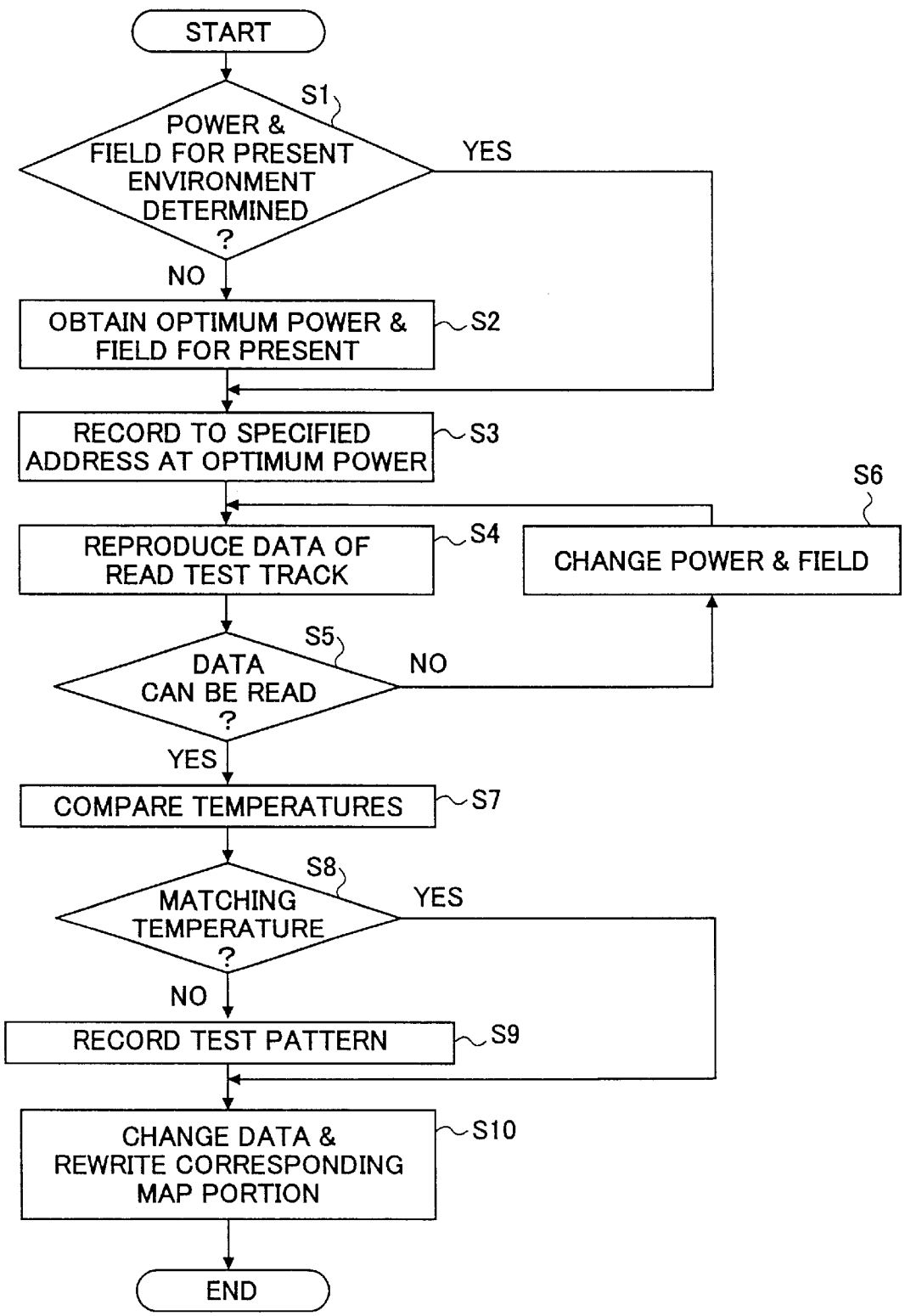
FIG. 6 is a flow chart for explaining an operation during a write.

FIG. 6 is a flow chart for explaining an operation of this embodiment during the write. The process shown in FIG. 6 corresponds to the process of the CPU 3 shown in FIG. 3.

The process shown in FIG. 6 is started when a write command is issued from the host unit. A step S1 decides whether or not the write power, the read power and the reproducing magnetic field for the present environment are determined. The process advances to a step S2 if the decision result in the step S1 is NO, and the process advances to a step S3 if the decision result in the step S1 is YES. The step S2 carries out the test write and the test read of the data with respect to the test track region portion of the test track region on the MSR disk, while changing the write power, the read power and the reproducing magnetic field, so as to obtain the present optimum write power, read power and reproducing power. The step S3 records the data stored in the RAM 4 or the ROM 5 or the data received from the host unit to an address which is specified by the write command, a the present optimum write power. In addition, a step S4 makes a seek to the corresponding map portion of the read test track region, and reproduces the data of the read test track.

A step S5 decides whether or not the data of the read test track can be reproduced. If the decision result in the step S5 is NO, a step S6 changes the read power and the reproducing magnetic field for reproducing the data of the read test track by a retry, and the process returns to the step S4. On the other hand, if the decision result in the step S5 is YES, a step S7 compares the temperatures within the data of the read test track and the present temperature which is detected by the temperature sensor 20.

A step S8 decides whether or not the present temperature is included in the temperatures within the data of the read test track. The process advances to a step S9 if the decision result in the step S8 is NO, and the process advances to a step S10 if the decision result in the step S8 is YES. The step S9 searches for a blank (free) portion within the temperature-based read test track region portion, and records a test pattern in the blank portion at the present optimum write power. The step S10 changes the data of the read test track to the data which is recorded this time, and changes the corresponding map portion of the read test track region depending on this change in the data. The process ends after the step S10.

Figure 7:
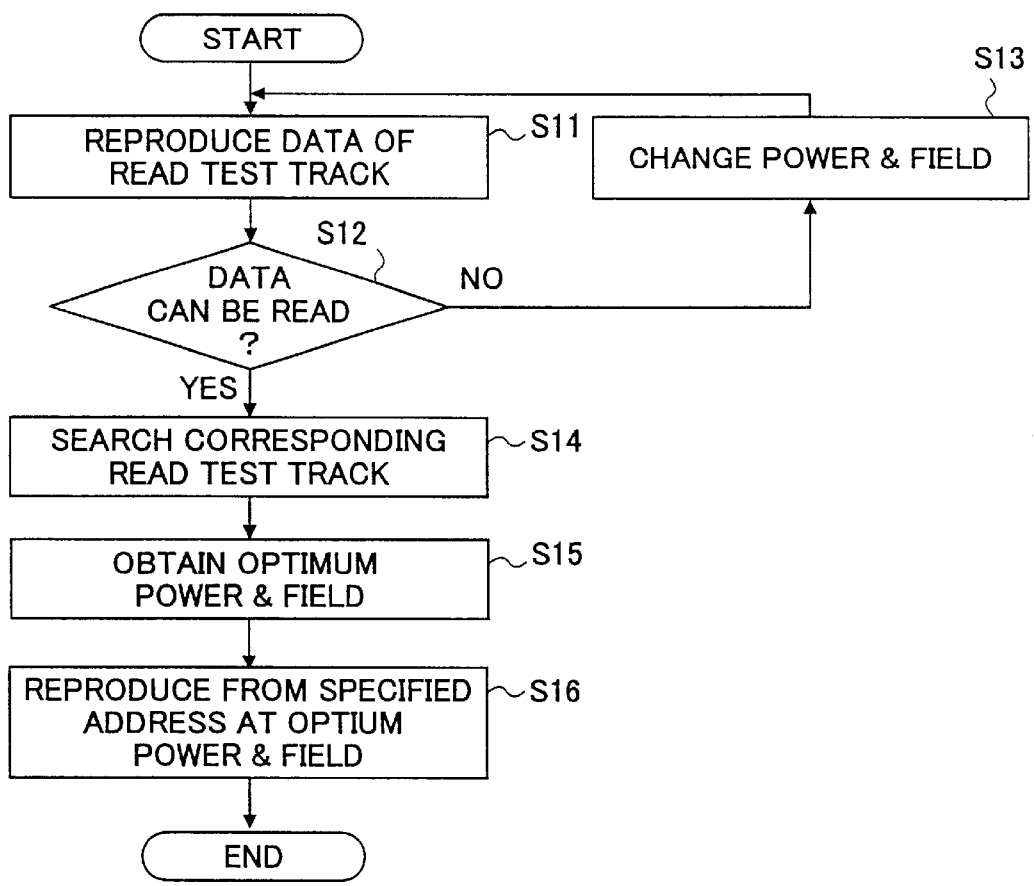
FIG. 7 is a flow chart for explaining an operation during a read.

FIG. 7 is a flow chart for explaining an operation of this embodiment during the read. The process shown in FIG. 7 corresponds to the process of the CPU 3 shown in FIG. 3.

The process shown in FIG. 7 is started when a read command is issued from the host unit. A step S11 makes a seek to the corresponding map portion of the read test track region, and reproduces the data of the read test track. A step S12 decides whether or not the data of the read test track can be reproduced. If the decision result in the step S12 is NO, a step S13 changes the read power and the reproducing magnetic field for reproducing the data of the read test track by a retry, and the process returns to the step S11. On the other hand, if the decision result in the step S12 is YES, a step S14 searches for the read test track corresponding to the address which is specified by the data of the read test track. In addition, a step S15 makes a test read from a target read test track, and obtains optimum read power and reproducing magnetic field. A step S16 reproduces the data at the address specified by the read command at the optimum read power and reproducing magnetic field, and the process ends. The reproduced data is stored in the RAM 4 and/or transferred to the host unit.

When the guaranteed operation temperature range of the magneto-optical disk unit is 0° C. to 55° C., for example, the temperature which is detected by the temperature sensor 20 in this guaranteed operation temperature range is approximately 10° C. to 65° C. For this reason, in order to store the test write data for every 1° C., for example, it is necessary to use approximately 56 read test tracks in the temperature-based read test track region portion, within the test track region of each zone. Hence, a description will next be given of a modification which stores the test write data for every temperature range, instead of every small temperature steps, so that it is possible to reduce the number of read test tracks which are required.

Figure 1:
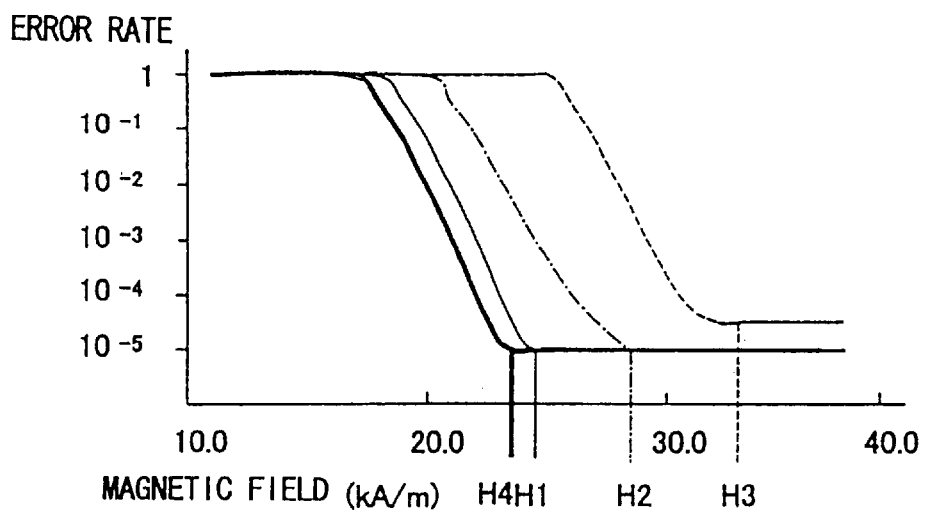
FIG. 1 is a diagram showing a relationship between a reproducing magnetic field and an error rate of a MSR recording medium.
Figure 2:
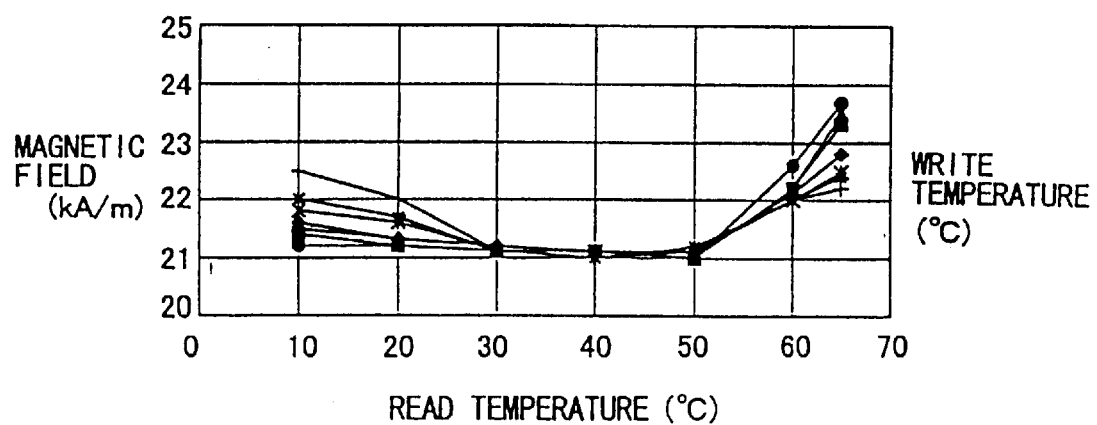
FIG. 2 is a diagram showing inflection points of the reproducing magnetic field which are plotted for a MSR recording medium.

In this modification, the test write data is stored for each of first, second, third and fourth temperature ranges, by dividing the temperature which is detected by the temperature sensor 20 in the guaranteed operation temperature range into four ranges, based on FIG. 2. The first temperature range is approximately from 10° C. to 30° C., the second temperature range is approximately from 31° C. to 50 ° C., the third temperature range is approximately from 51° C. to 60° C., and the fourth temperature range is approximately from 61° C. to 65° C. As a result, the number of read test tracks which are required to store the test write data for each of the four temperature ranges, within the test track region of each zone shown in FIG. 4, is only approximately four in the temperature-based read test track region portion. Of course, the number of temperature ranges is not limited to four.

According to this modification, the test track region has the structure shown in FIG. 4, but the corresponding map portion of the read test track region is recorded with information shown in FIG. 8. FIG. 8 is a diagram for explaining the corresponding map portion of the read test track region of this modification. As shown in FIG. 8, the corresponding map portion of the read test track region includes an identification symbol which indicates a boundary of the map, a start address and an end address of the read test track for each write temperature range, a start address and an end address of each of the corresponding data, and an end identification symbol which indicates an end position of the map. The identification symbol and the end identification symbol are set to a value such as "FFFFFFF" which does not exist in the case of the address, so as to avoid confusion with an address value such as "0A1E".

In the case shown in FIG. 8, it is indicated that the corresponding data with respect to the first temperature range of approximately 10° C. to 30° C. exist at addresses 3/00 to 3/10 and 5/00 to 5/05, and that the corresponding read tracks exist at addresses 99A/00 to 99C/08. It is indicated that the corresponding data with respect to the second temperature range of approximately 31° C. to 50° C. exist at addresses 4/00 to 4/10, and that the corresponding read tracks exist at addresses 99C/09 to 99E/0F. It is indicated that the corresponding data with respect to the third temperature range of approximately 51° C. to 60° C. exist at addresses 5/06 to 5/08 and 6/00 to 6/02, and that the corresponding read tracks exist at addresses 99E/10 to 9A2/07. Further, it is indicated that the corresponding data with respect to the fourth temperature range of approximately 61 ° C. to 65° C. exist at addresses 3/00 to 5/09 to 5/10, and that the corresponding read tracks exist at addresses 9A2/08 to 9A2/07. Accordingly, by reproducing the corresponding map portion of the read test track region, it is possible to know the write temperature range of the data which is presently to be reproduced and the addresses of the read test tracks.

Instead of determining the read test tracks corresponding to the temperature ranges at random each time, it is desirable to determine the read test tracks corresponding to each of the temperature ranges for each zone in advance according to a rule, and to prestore such read test tracks which are determined in advance in a form of a setting table. FIG. 9 is a diagram for explaining the setting table of this modification. The setting table shown in FIG. 9 is for the same zones shown in FIG. 8, and is stored in the ROM 5, for example. In FIG. 9, those parts which are the same as those corresponding parts in FIG. 8 are designated by the same reference numerals, and a description thereof will be omitted. As may be seen from FIG. 9, the data address shown in FIG. 8 is not recorded in the setting table. By prestoring the setting table such as that shown in FIG. 9 with respect to each zone, it is possible to create the corresponding map of the read test track in a simple manner using the setting table.

Figure 10:
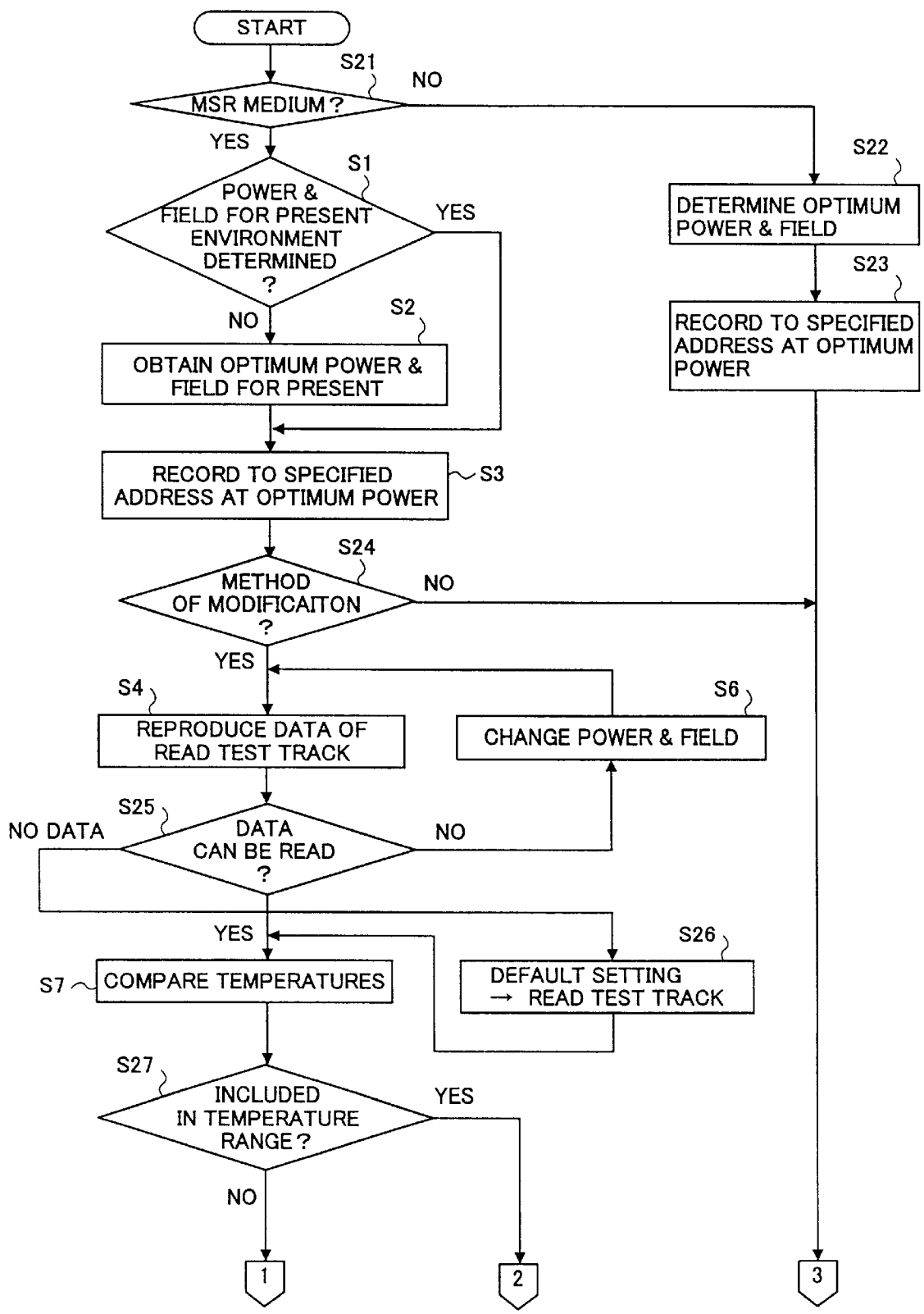
FIG. 10 is a flow chart for explaining an operation during the write in the modification.
Figure 11:
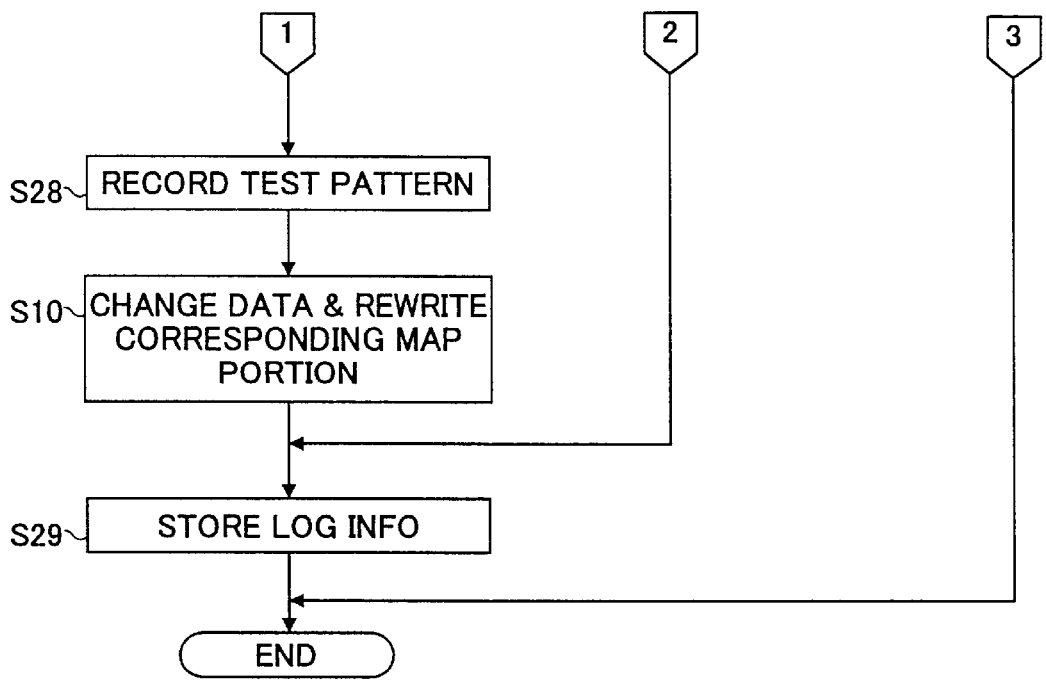
FIG. 11 is a flow chart for explaining the operation during the write in the modification.

FIGS. 10 and 11 are flow charts for explaining an operation of this modification during the write. The process shown in FIGS. 10 and 11 correspond to the process of the CPU 3 shown in FIG. 3. In FIGS. 10 and 11, those steps which are basically the same as those corresponding steps in FIG. 6 are designated by the same reference numerals, and a description thereof will be omitted.

The process shown in FIGS. 10 and 11 is started when a write command is issued from the host unit. A step S21 decides whether or not the optical disk which is loaded into the magneto-optical disk unit is a MSR disk. A known disk type judging method, such as a method which reproduces information recorded on a control track (control region) on the optical disk, may be employed to judge whether or not the loaded optical disk is the MSR disk. If the decision result in the step S21 is NO, a step S22 determines optimum values for the write power, the read power and the reproducing magnetic field, by a method of determining the write power, the read power and the reproducing magnetic field for the type of the loaded optical disk. In addition, a step S23 records the data stored in the RAM 4 or the ROM 5 or the data received from the host unit, at the address specified by the write command. The process ends after the step S23, as shown in FIG. 11.

On the other hand, if the decision result in the step S21 is YES, the process advances to the step S1, and the steps S1 through S3 are carried out. After the step S3, a step S24 decides whether or not to employ the method of this modification. If the method of this modification is not employed and the conventional method is to be employed, the decision result in the step S24 is NO, and the process ends as shown in FIG. 11. For example, it is possible to judge whether or not to employ the method of this modification based on a switching command issued from the host unit, and this switching command may be issued from the host unit based on an input made by a user. Accordingly, it is possible to employ the conventional method even when the MSR disk is loaded into the magneto-optical disk unit.

If the decision result in the step S24 is YES, the process advances to the step S4, and after the step S4, a step S25 decides whether or not the data of the read test track can be read. If the decision result in the step S25 is NO, the process advances to the step S6, and after the step S6, the process returns to the step S4. On the other hand, if the decision result in the step S25 is YES, the process advances to the step S7, and after the step S7, the process advances to a step S27. In addition, if it is found as a result of the decision in the step S25 that there is no data in the read test track, the process advances to a step S26. The step S26 refers to the setting table corresponding to a target zone, and uses a default setting of the setting table as the data of the read test track, and the process then advances to the step S7.

The step S27 decides whether or not the present temperature is included within the temperature ranges within the data of the read test track. If the decision result in the step S27 is NO, the process advances to a step S28 shown in FIG. 11. The process advances to a step S29 shown in FIG. 11 if the decision result in the step S27 is YES. The step S28 searches for a blank (free) portion within the temperature-based read test track region portion, and records a test pattern in the blank portion at the present optimum write power. The step S10 changes the data of the read test track to the data which is recorded this time, and changes the corresponding map portion of the read test track region depending on this change in the data. In addition, a step S29 stores the zone, the write temperature range, the read temperature or the read temperature range, and the optimum values of the write power, read power and reproducing magnetic field into the RAM 4 as log information, and the process ends.

Figure 12:
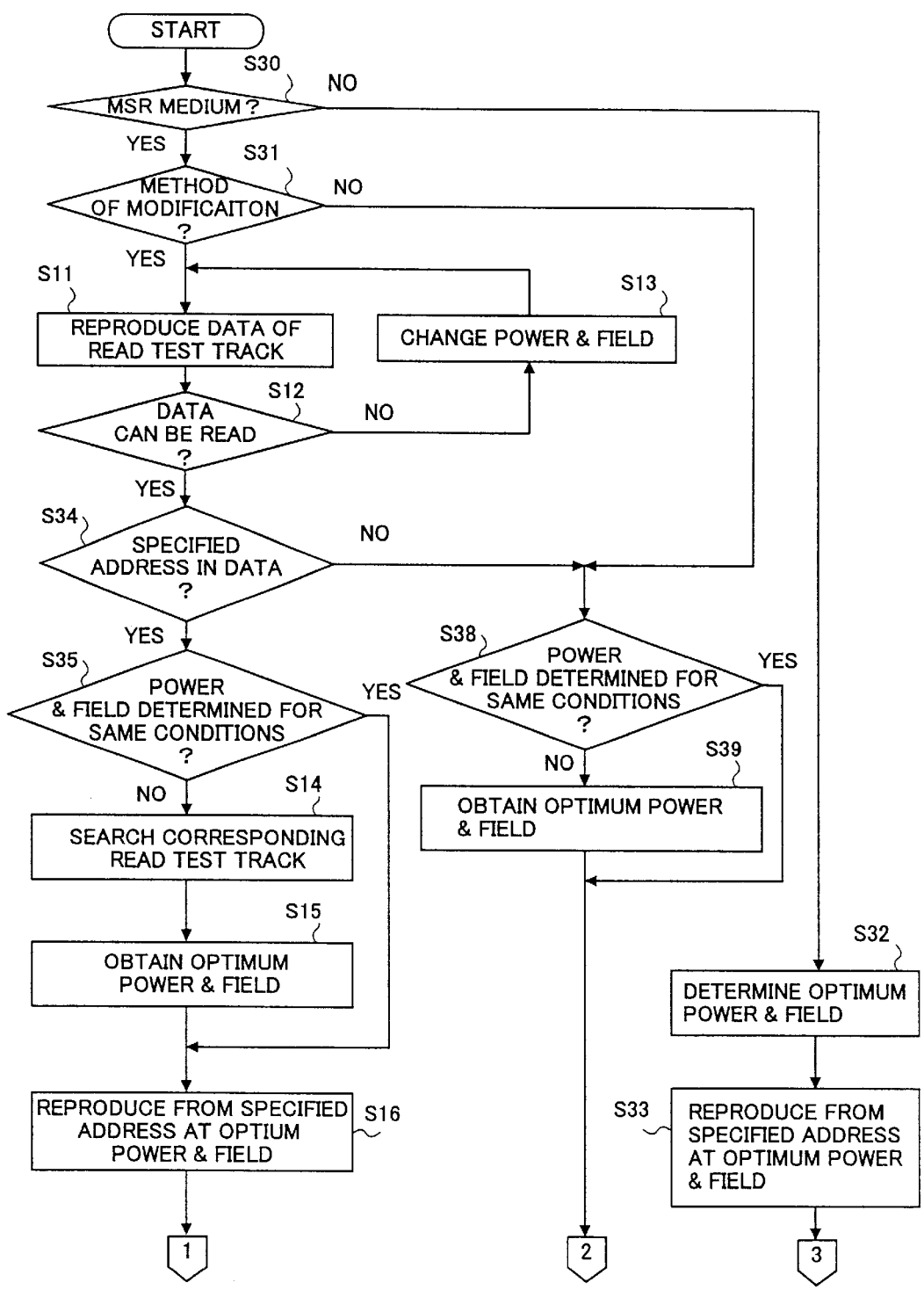
FIG. 12 is a flow chart for explaining an operation during the read in the modification.
Figure 13:
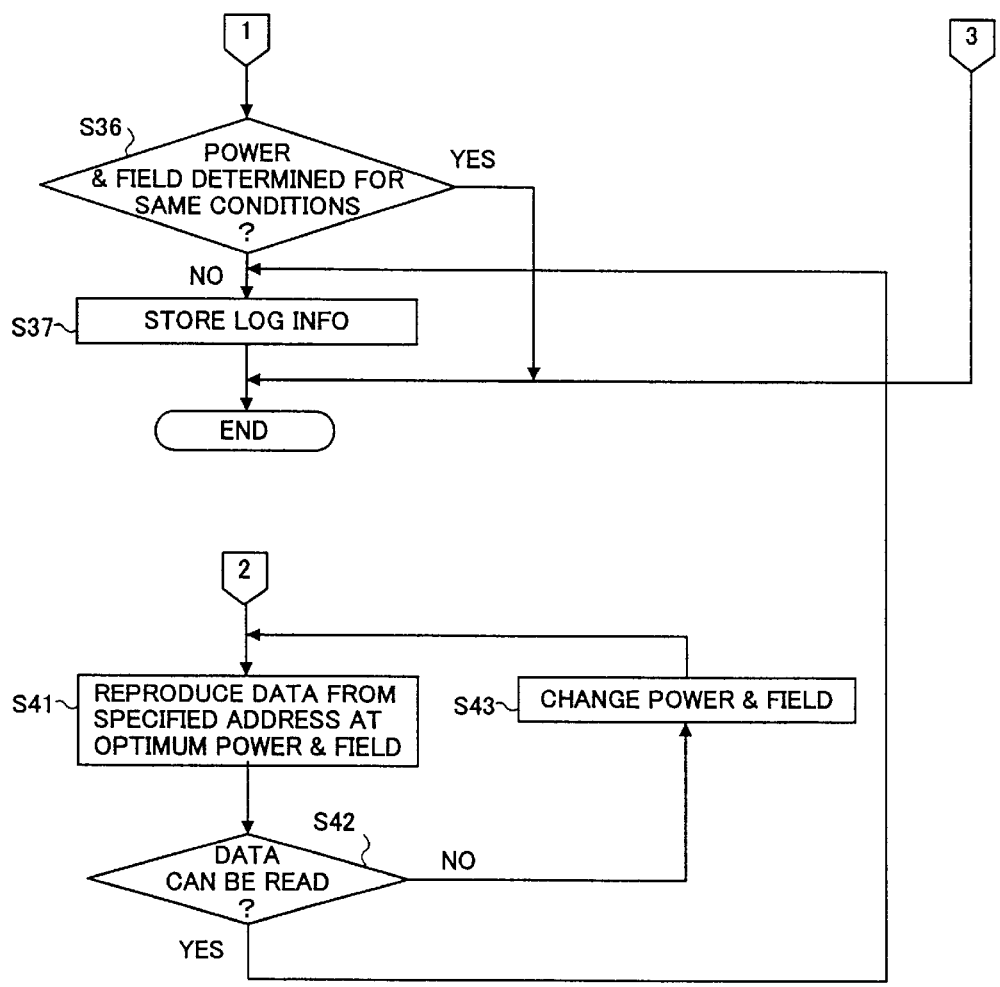
FIG. 13 is a flow chart for explaining the operation during the read in the modification.

FIGS. 12 and 13 are flow charts for explaining an operation of this modification during the read. The process shown in FIGS. 12 and 13 corresponds to the process of the CPU 3 shown in FIG. 3. In FIGS. 12 and 13, those steps which are basically the same as those corresponding steps in FIG. 7 are designated by the same reference numerals, and a description thereof will be omitted.

The process shown in FIGS. 12 and 13 is started when a read command is issued from the host unit. A step S30 decides whether or not the optical disk loaded into the magneto-optical disk unit is a MSR disk, similarly to the step S21 shown in FIG. 10. If the decision result in the step S30 is NO, a step S32 determines optimum values for the read power and the reproducing magnetic field, by a method of determining the read power and the reproducing magnetic field for the type of the loaded optical disk. In addition, a step S33 reproduces the data from the address specified by the read command at the optimum read power and reproducing magnetic field. The process ends after the step S33, as shown in FIG. 13.

On the other hand, if the decision result in the step S30 is YES, a step S31 decides whether or not to employ the method of this modification, similarly to the step S24 shown in FIG. 10. If the decision result in the step S31 is NO, the process advances to a step S38 which will be described later. The process advances to the step S11 if the decision result in the step S31 is YES. The step S11 makes a seek to the corresponding map portion of the read test track region, and reproduces the data of the read test track. The step S12 decides whether or not the data of the read test track can be reproduced. If the decision result in the step S12 is NO, the step S13 changes the read power and the reproducing magnetic field for reproducing the data of the read test track by a retry, and the process returns to the step S11. On the other hand, if the decision result in the step S12 is YES, a step S34 decides whether or not the address specified by the read command is included in the data of the read test track.

If the decision result in the step S34 is YES, a step S35 decides whether or not the write power, the read power and the reproducing magnetic field are determined for the same conditions. The process advances to the step S14 if the decision result in the step S35 is NO, and the process advances to the step S16 if the decision result in the step S35 is YES. After the steps S14 through S16, the process advances to a step S36 shown in FIG. 13. The step S36 decides whether or not the write power, the read power and the reproducing magnetic field are determined for the same conditions, and the process ends if the decision result in the step S36 is YES. If the decision result in the step S36 is NO, a step S37 stores the zone, the write temperature range, the read temperature or the read temperature range, and the optimum values of the read power and reproducing magnetic field into the RAM 4 as log information, and the process ends. This log information may also include the optimum value of the write power.

On the other hand, if the decision result in the step S31 or S34 shown in FIG. 12 is NO, a step S38 decides whether or not the write power, the read power and the reproducing magnetic field are determined for the same conditions. The process advances to a step S41 shown in FIG. 13 if the decision result in the step S38 is YES. If the decision result in the step S38 is NO, a step S39 carries out a test write and a test read with respect to the test track region portion while changing the write power, the read power and the reproducing magnetic field, so as to obtain the optimum write power, read power and reproducing magnetic field for the present, and the process advances to the step S41 shown in FIG. 13.

In FIG. 13, the step S41 reproduces the data from the address which is specified by the read command, at the optimum read power and reproducing magnetic field. A step S42 decides whether or not the data can be read, and the process advances to the step S37 if the decision result in the step S42 is YES. On the other hand, if the decision result in the step S42 is NO, a step S43 reproduces the data while changing the read power and the reproducing magnetic field, so as to reproduce the data by a retry, and the process returns to the step S41.

In the embodiment and the modification described above, the read power and the reproducing magnetic field during the read are controlled to the optimum values, but it is of course possible to control at least the reproducing magnetic field to the optimum value.

Therefore, according to the present invention, it is possible to reproduce the data at he optimum conditions, even if the temperatures at the time of the write and the read differ. For this reason, it is possible to suppress the generation of errors and the generation of alternate processes which are caused by the difference between the write temperature and the read temperature. In addition, even if an erroneous setting is generated for some reason, the data which is subjected to the test write and read may be erased, but the actual data will not be erased during the read.

Figure 14A:
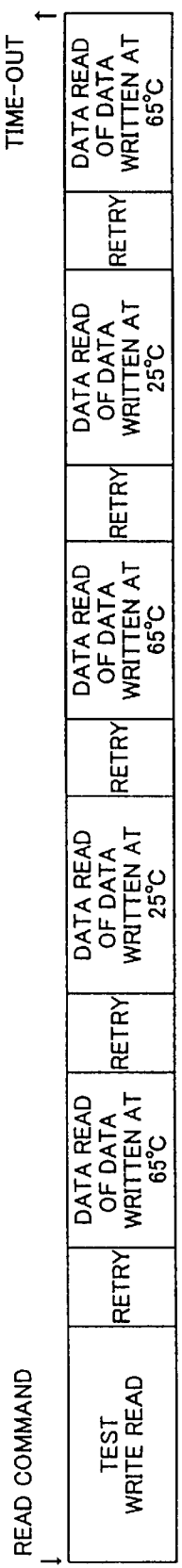
FIGS. 14A and 14B respectively are diagrams for explaining a retry.
Figure 14B:
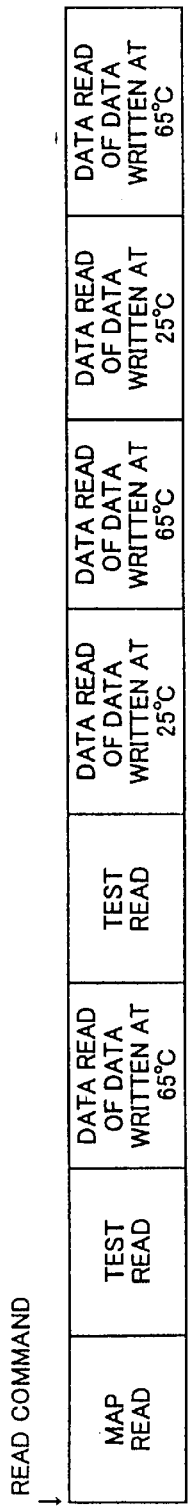

Furthermore, depending on the host unit which uses the magneto-optical disk unit, the retry time is limited. Consequently, the retry may be ended by a time-out in the case of such a host unit. But such a problem will not occur in the present invention. FIGS. 14A and 14B are diagrams for explaining the retry. FIG. 14A shows a case where the conventional method is employed, and FIG. 14B shows a case where the method of the present invention is employed.

In the case of the conventional method, when the present temperature is 35° C. and the read command is issued from the host unit, the test write read is carried out. But since the write data read at 65° C. with respect to the data having the write temperature of 65° C. cannot be carried out unless the read conditions are optimized by the retry, the write data read at 65° C. is carried out after the retry. Similarly, the write data read at 25° C. with respect to the data having the write temperature of 25° C. cannot be carried out unless the read conditions are optimized by the retry, and the write data read at 25° C. is carried out after the retry. In other words, the retry is carried out every time for each different write temperature. As a result, when the retry time is limited by the host unit, the retry is ended by the time-out as shown in FIG. 14A.

On the other hand, in the case of the method according to the present invention, when the present temperature is 35° C. and the read command is issued from the host unit, a map read is first carried out to reproduce the corresponding map portion of the read test track region of the test track region in the corresponding zone. Then, a test read is carried out based on the map read, and the write data read at 65° C. is carried out with respect to the data having the write temperature of 65° C. under the reproducing conditions based on the test read. In addition, a test read is carried out based on the map read, and the write data read at 25° C. is carried out with respect to the data having the write temperature of 25° C. under the reproducing conditions based on the test read. Thereafter, the write data read at 65° C. and the write data read at 25° C. can be completed before the host unit detects a time-out for the retry time.

The basic structure of the magneto-optical disk unit is not limited to the structure shown in FIG. 3, and various other known basic structures may be used instead. The present invention is applicable to a storage unit having any known structure including a means for detecting the temperature and a processor for controlling the laser power and the magnetic field, by appropriately modifying a program which is executed by the processor so as to carry out the operation of the embodiment or modification described above.

In the described embodiment, the MSR disk used employs the DRAD system. However, the MSR employed by the optical disk is of course not limited to the DRAD system, and the present invention is similarly applicable to optical recording media employing other MSR systems, such as the center-aperture-detection (CAD) system.

Moreover, in the described embodiment, the corresponding map portion of the read test track region is provided within the test track region. However, this corresponding map portion may be provided in a region other than the test track region. In a case where the corresponding map portion is recorded in a control region which is recorded with various control information including the type of recording medium, the information of the corresponding map portion may be stored in the RAM 4 when storing in the RAM 4 the various control information which is read from the MSR disk at the time when the MSR disk is loaded into the magneto-optical disk unit. Hence, by referring to the corresponding map portion of the zone to be tested, it is possible to know the write temperature of the data which is presently to be reproduced and the address of the corresponding read test track, similarly as in the case of the above described embodiment. The information of the corresponding map portion within the RAM 4 may be updated during the test read or write, and processes such as rewriting the updated information back to the MSR disk when waiting for a command or when unloading the MSR disk from the magneto-optical disk unit, can be realized relatively easily by controlling the firmware of the CPU 3. In this case, it is possible to simplify the read/write process for rewriting the information of the corresponding map portion. However, when the power is suddenly cut off, there is a possibility that the information of the corresponding map portion is not updated. Hence, it is desirable to frequently carry out the process of rewriting the updated information back to the MSR disk, and from the point of view of data protection, it is more effective to provide the corresponding map portion within the test track region as in the described embodiment.

Further, the present invention is not limited to these embodiments, but various variations and modifications may be made without departing from the scope of the present invention.

What is claimed is:

1. An optical recording medium comprising:
   a test track region corresponding to each zone; and
   a corresponding map portion of read test track region,
   wherein:
   said test track region including a test track region portion which includes one or more test tracks to which a test write and a test read are carried out, and a temperature-based read test track region portion,
   said temperature-based read test track region portion includes one or more read test tracks, and a recording is made at an optimum write power for a write temperature during a write and a test read is made during a read so that at least an optimum reproducing magnetic field is set, and
   said corresponding map portion of the read test track region is recorded with an identification symbol which indicates a boundary of a map, a start address and an end address of the read test track for each write temperature information, a start address and an end address of each corresponding data, and an end identification symbol which indicates an end position of the map.

2. The optical recording medium as claimed in claim 1, wherein said corresponding map portion of the read test track region is further recorded with a start address and an end address of the read test track for each write temperature range.

3. A storage unit having functions of controlling a write power, a read power and a reproducing magnetic field with respect to an optical recording medium, comprising:
   first means for storing test write data on the optical recording medium for each write temperature information during a write; and
   second means for controlling at least the reproducing magnetic field depending on optimum reproducing conditions which are obtained by reproducing the test write data corresponding to a write temperature of data which is to be actually reproduced from the optical recording medium during a read.

4. The storage unit as claimed in claim 3, wherein said first means carries out a recording at an optimum write power for the write temperature during a test write which records data in a test track region of the optical recording medium, and carries out a test read to set optimum read power and reproducing magnetic field in the test track region as the test write data, and records a start address and an end address of a read test track and a start address and an end address of each corresponding data for each write temperature information in the test track region as the test write data.

5. The storage unit as claimed in claim 4, wherein said second means further controls the read power in addition to the reproducing magnetic field, depending on the optimum reproducing conditions which are obtained base on the test write data which are reproduced from the test track region.

6. The storage unit as claimed in claim 5, wherein said first means records a start address and an end address of the read test track and the start address and the end address of each corresponding data for each write temperature range, as a corresponding map portion of the read test track region.

7. The storage unit as claimed in claim 6, further comprising:
a setting table which stores default values of the corresponding map portion of the read test track region,
said first means creating the corresponding map portion of the read test track region using the setting table, and recording the corresponding map portion in the test track region of the optical recording medium.

8. The storage unit as claimed in claim 4, wherein said first means records a start address and an end address of the read test track and the start address and the end address of each corresponding data for each write temperature range, as a corresponding map portion of the read test track region.

9. The storage unit as claimed in claim 8, further comprising:
a setting table which stores default values of the corresponding map portion of the read test track region,
said first means creating the corresponding map portion of the read test track region using the setting table, and recording the corresponding map portion in the test track region of the optical recording medium.

10. A recording and reproducing method adapted to a storage unit which has functions of controlling a write power, a read power and a reproducing magnetic field with respect to an optical recording medium, comprising the steps of:
storing test write data on the optical recording medium for each write temperature information during a write; and
controlling at least the reproducing magnetic field depending on optimum reproducing conditions which are obtained by reproducing the test write data corresponding to a write temperature of data which is to be actually reproduced from the optical recording medium during a read.

11. An optical recording medium comprising:
a test track region corresponding to each zone,
said test track region including a corresponding map portion of a read test track region, a test track region portion, and a temperature-based read test track region portion,
said test track region portion including one or more test tracks to which a test write and a test read are carried out,
said temperature-based read test track region portion including one or more read test tracks, and a recording is made at an optimum write power for a write temperature during a write and a test read is made during a read, so that at least an optimum reproducing magnetic field is set,
said corresponding map portion of the read test track region including an identification symbol which indicates a boundary of a map, a start address and an end address of a read test track for each write temperature information, a start address and an end address of each corresponding data, and an end identification symbol which indicates an end position of the map.

12. A storage unit having functions of controlling a write power, a read power and a reproducing magnetic field with respect to an optical recording medium, comprising:
a first control section to store test write data on the optical recording medium for each write temperature information during a write; and
a second control section to control at least the reproducing magnetic field depending on optimum reproducing conditions which are obtained by reproducing the test write data corresponding to a write temperature of data which is to be actually reproduced from the optical recording medium during a read.

* * * * *